United States Patent [19]

Berney

[11] 4,031,438

[45] June 21, 1977

[54] CONTROL DEVICE FOR THE ROTARY MOTOR OF A WATCH

[75] Inventor: Jean-Claude Berney, Lausanne, Switzerland

[73] Assignee: Ebauches S.A., Neuchatel, Switzerland

[22] Filed: Jan. 20, 1976

[21] Appl. No.: 650,737

[30] Foreign Application Priority Data

Feb. 11, 1975 Switzerland ........................ 1631/75

[52] U.S. Cl. ................................ 318/331; 318/341

[51] Int. Cl.² ........................................ G05B 5/00

[58] Field of Search ........... 318/314, 318, 331, 341

[56] References Cited

UNITED STATES PATENTS

| | | | |
|---|---|---|---|
| 3,525,915 | 8/1970 | Barter | 318/341 |
| 3,536,971 | 10/1970 | McMillen et al. | 318/331 |
| 3,555,387 | 1/1971 | Ulrich | 318/331 |
| 3,588,654 | 6/1971 | Balazs | 318/331 |
| 3,683,253 | 8/1972 | Rummel et al. | 318/331 |
| 3,885,206 | 5/1975 | Hort | 318/314 |

*Primary Examiner*—Robert K. Schaefer
*Assistant Examiner*—John J. Feldhaus
*Attorney, Agent, or Firm*—Imirie, Smiley & Linn

[57] ABSTRACT

A control device for the motor of a watch including first and second zero detectors and a delay device for providing gating signals to an AND gate to enable transmission of driving in phase with the a.c. voltage induced in the coil.

2 Claims, 2 Drawing Figures

CONTROL DEVICE FOR THE ROTARY MOTOR OF A WATCH

BACKGROUND OF THE INVENTION

The present invention concerns a control device for the rotary motor of a watch.

In order to keep the operation of a rotary motor smooth pulses must be applied to the driving coil in phase with the a.c. voltage induced on the terminals of the coil. A simple method consists in using a zero detector controlling a logic circuit which delivers positive driving pulses during the positive period of the a.c. voltage, or negative driving pulses during the negative period of the a.c. voltage. For applications to clock or watch making in which the motor is most frequently controlled at a constant speed, this system has very serious disadvantages. The efficiency is low, thus implying high consumption and a short battery life. The speed of rotation is considerably dependent on the load torque of the motor and since the load torque in a watch is very variable, there will be considerable risk of instability of the control coil.

SUMMARY OF THE INVENTION

According to the present invention there is provided a control device for the rotary motor of a watch, comprising: a first zero detector, the input of which is connected to a coil of the motor and the output of which is connected to a delay device; a second zero detector, the input of which is connected to the coil of the motor via a capacitor, which may be short-circuited by a switch controlled by the output of the delay device; and a logic circuit, delivering driving pulses to the coil during the time in which the second detector and the delay device simultaneously deliver an output signal.

The time during which drive pulses are delivered depends on the period T of the voltage induced on the terminals of the coil according to the formula ($T/2 - 2t$) in which $t$ represents the delay provided by the delay device. The value of this formula is zero for $T = 4t$, which sets a minimum period, hence a maximum speed of rotation independently of the load torque of the motor. However, this time is symmetrically distributed relatively to the maximum voltage induced, thus automatically ensuring the best possible efficiency.

DETAILED DESCRIPTION

Figure 1:
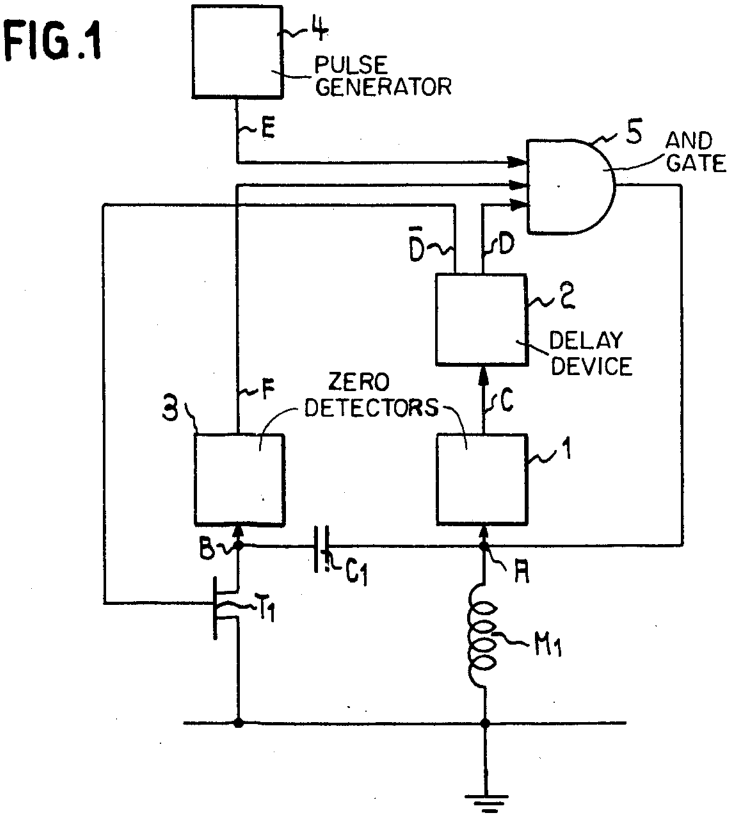
FIG. 1 shows, by way of example, a block circuit diagram of the device according to the present invention.

In FIG. 1 a driving coil M1 is connected to the input of a first zero detector 1, the output of which is connected to the input of a delay device 2 which introduces a delay $t$ in the engaging or coupling process. The input of a second zero detector 3, connected to the coil M1 via a capacitor C1, may be short-circuited by an MOS transistor T1, the gate of which is connected to the inverse output of the delay device 2. The output of the delay device 2 and of the second zero detector 3 are applied to the input of an AND gate 5, together with the output of a pulse generator 4. The output of the AND gate 5 is applied to the coil M1.

Figure 2:
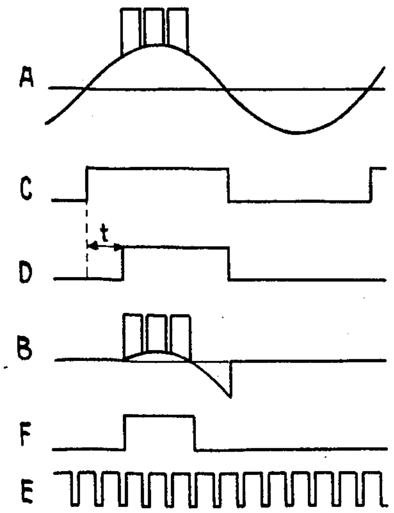
FIG. 2 shows the voltage waveforms at different points of the circuit.

Examination of the waveforms shown in FIG. 2 will readily reveal the operation of the device. The voltage on the terminals of the coil (point A) is applied to the first zero detector which gives a positive signal during the positive half of the induced voltage (point C). The delay device introduces a delay in the engaging or coupling process and presents at the output a positive signal retarded by the time $t$ relatively to its input (point D).

The input of the second zero detector is short-circuited whenever the output D of the delay device 2 is at zero. When this output passes to 1, the short-circuit is interrupted and the voltage of the coil M1 is transmitted by the capacitor C1 (point B). It will be seen that the voltage at the input B becomes positive, then becomes negative again. The output of the second zero detector 3 delivers a positive signal when its input is positive (Point F). It will be noted that the duration of this signal is symmetrically distributed relative to the maximum induced voltage. The driving pulses delivered by the pulse generator 4 (point E) are applied to the coil M1 when the voltages at the points D and F are simultaneously positive, a fact which can be ascertained at the points A and B.

The ratio between the duration of the positive signal at Point F and the period T is equal to $$\frac{\left(\frac{T}{4}-t\right)2}{T}=\frac{1}{2}-\frac{2t}{T}$$

For $t = T/4$, the ratio is zero and the motor no longer receives any driving pulses.

It will therefore be seen that the power delivered to the motor, which is a function of the above ratio, is completely dependent on the period, a feature which tends to stabilise the speed of rotation of the motor.

This device is particularly useful when the motor is phase-controlled, since the feature of introducing a considerable reduction of power as a function of the speed eliminates the risks of instability of the control coil and makes it possible to dampen very rapidly the oscillations due to external disturbances. The operation may be controlled very simply by adjusting the time delay $t$. When the motor is advanced in phase, $t$ should be greater than To/4; if the motor is retarded in phase, $t$ should be less than To/4, To being the gating period.

We claim:

1. A control device for the rotary motor of a watch, comprising: a first zero detector, an input of which is connected to a coil of the motor and the output of which is connected to a delay device; a second zero detector, the input of which is connected to the coil of the motor via a capacitor, which may be short-circuited by a switch controlled by the output of the delay device; and a logic circuit, delivering driving pulses to the coil during the time in which the second detector and the delay device simultaneously deliver an output signal.

2. A control device according to claim 1, in which the said logic circuit, comprises a pulse generator and an AND gate.

* * * * *